(12) United States Patent
Kawaguchi et al.

(10) Patent No.: US 9,109,096 B2
(45) Date of Patent: Aug. 18, 2015

(54) THERMALLY EXPANDABLE MICROCAPSULE AND FOAM-MOLDED ARTICLE

(71) Applicant: Sekisui Chemical Co., Ltd., Osaka (JP)

(72) Inventors: Yasuhiro Kawaguchi, Yamaguchi (JP); Yoshiyuki Kosaka, Osaka (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 14/295,807

(22) Filed: Jun. 4, 2014

(65) Prior Publication Data

US 2014/0288199 A1 Sep. 25, 2014

Related U.S. Application Data

(62) Division of application No. 13/127,552, filed as application No. PCT/JP2009/066152 on Sep. 16, 2009, now abandoned.

(30) Foreign Application Priority Data

Nov. 7, 2008 (JP) ................................. 2008-286904
Aug. 7, 2009 (JP) ................................. 2009-184981

(51) Int. Cl.
| | |
|---|---|
| *C08J 9/16* | (2006.01) |
| *C08J 9/228* | (2006.01) |
| *C08J 9/232* | (2006.01) |
| *B01J 13/14* | (2006.01) |
| *B29C 67/24* | (2006.01) |
| *B29C 70/66* | (2006.01) |
| *C08F 220/44* | (2006.01) |
| *C08J 9/32* | (2006.01) |
| *C08F 220/50* | (2006.01) |
| *C08L 51/10* | (2006.01) |

(52) U.S. Cl.
CPC *C08J 9/228* (2013.01); *B01J 13/14* (2013.01); *B29C 67/247* (2013.01); *B29C 70/66* (2013.01); *C08F 220/44* (2013.01); *C08F 220/50* (2013.01); *C08J 9/32* (2013.01); *C08J 2203/22* (2013.01); *C08J 2333/22* (2013.01); *C08L 51/10* (2013.01)

(58) Field of Classification Search
USPC .......................................... 521/56, 59, 76, 182
See application file for complete search history.

(56) References Cited

U.S. PATENT DOCUMENTS

| | | | |
|---|---|---|---|
| 2,787,809 A | 4/1957 | Stastny | |
| 2,986,537 A | 5/1961 | Chaumeton | |
| 3,615,972 A | 10/1971 | Morehouse et al. | |
| 4,287,308 A | 9/1981 | Nakayama et al. | |
| 4,624,969 A | 11/1986 | Treptow et al. | |
| 4,689,355 A | 8/1987 | Treptow et al. | |
| 4,737,407 A | 4/1988 | Wycech | |
| 4,785,024 A | 11/1988 | Sakata et al. | |
| 5,302,427 A | 4/1994 | Murschall et al. | |
| 5,536,756 A | 7/1996 | Kida et al. | |
| 6,040,348 A | 3/2000 | Delaite et al. | |
| 6,235,394 B1 | 5/2001 | Shimazawa et al. | |
| 6,261,490 B1 | 7/2001 | Kliene | |
| 6,476,089 B1 | 11/2002 | Maletzko et al. | |
| 6,582,633 B2 | 6/2003 | Elfving et al. | |
| 6,593,383 B2 | 7/2003 | Yanagihara et al. | |
| 6,761,843 B2 | 7/2004 | Horiuchi et al. | |
| 6,930,132 B2 | 8/2005 | Coppini et al. | |
| 6,984,347 B2 * | 1/2006 | Masuda et al. | ............... 264/4.33 |
| 7,579,384 B2 | 8/2009 | Matsumura et al. | |
| 7,786,181 B2 | 8/2010 | Nordin et al. | |
| 7,956,096 B2 | 6/2011 | Nordin et al. | |
| 8,058,320 B2 | 11/2011 | Ejiri et al. | |
| 8,088,482 B2 | 1/2012 | Glorioso et al. | |
| 2001/0016610 A1 | 8/2001 | Maletzko et al. | |
| 2002/0135084 A1 | 9/2002 | Ohmura et al. | |
| 2003/0091843 A1 | 5/2003 | Murschall et al. | |

(Continued)

FOREIGN PATENT DOCUMENTS

| | | |
|---|---|---|
| EP | 1 149 628 | 10/2001 |
| EP | 1 508 604 | 2/2005 |

(Continued)

OTHER PUBLICATIONS

International Search Report issued Nov. 17, 2009 in International (PCT) Application No. PCT/JP2009/066151.
Product Specification for EXPANCAL® MB Microspheres, 2011, Azko Nobel, Issue Nov. 2011.
Concise Encyclopedia of Polymer Science and Engineering, 1994, pp. 106-107, with partial English language translation.
EXPANCEL Microspheres Product Specification, EXPANCEL MB, "Masterbatch with Unexpanded Microspheres", Apr. 2007.
EXPANCEL® DU Product Specification, Dry Unexpanded Microspheres, issued Aug. 2005.

(Continued)

*Primary Examiner* — Kara Boyle
(74) *Attorney, Agent, or Firm* — Wenderoth, Lind & Ponack, L.L.P.

(57) ABSTRACT

A thermally expandable microcapsule, which shows excellent heat resistance and a high expansion ratio and thereby can be suitably used for molding processes involving high shearing force, such as kneading molding, calender molding, extrusion molding, and injection molding. The thermally expandable microcapsule also provides a foamed product using the thermally expandable microcapsule. The thermally expandable microcapsule contains a shell made of a polymer; and a volatile expansion agent as a core agent encapsulated in the shell, the storage elastic modulus (E') of the shell at a temperature of 200° C. and a frequency of 10 Hz being $1 \times 10^5$ N/m² or more, the storage elastic modulus (E') of the shell at a temperature of 250° C. and a frequency of 10 Hz being $1 \times 10^5$ N/m² or more, and a maximum displacement amount measured by thermomechanical analysis being 300 μm or more.

15 Claims, No Drawings

(56) References Cited

U.S. PATENT DOCUMENTS

| | | |
|---|---|---|
| 2005/0164022 A1 | 7/2005 | Kliesch et al. |
| 2005/0249947 A1 | 11/2005 | Wittmann |
| 2006/0063000 A1 | 3/2006 | Tokumura et al. |
| 2006/0269712 A1 | 11/2006 | Palmlof |
| 2007/0112081 A1 | 5/2007 | Hahn et al. |
| 2007/0142485 A1 | 6/2007 | Nordin et al. |
| 2007/0208093 A1 | 9/2007 | Nordin et al. |
| 2007/0219281 A1 | 9/2007 | Ejiri et al. |
| 2007/0227814 A1 | 10/2007 | Schabel, Jr. |
| 2008/0207434 A1 | 8/2008 | Martinez et al. |
| 2009/0149559 A1 | 6/2009 | Masuda et al. |
| 2009/0292031 A1 | 11/2009 | Ejiri |
| 2010/0190877 A1 | 7/2010 | Schips et al. |
| 2011/0203756 A1 | 8/2011 | Nordin et al. |

FOREIGN PATENT DOCUMENTS

| | | |
|---|---|---|
| EP | 1 598 405 | 11/2005 |
| EP | 1 947 121 | 7/2008 |
| GB | 1044680 | 12/1963 |
| JP | 42-26524 | 12/1962 |
| JP | 5-15499 | 3/1993 |
| JP | 10-212372 | 8/1998 |
| JP | 2894990 | 3/1999 |
| JP | 11-343362 | 12/1999 |
| JP | 2000-178372 | 6/2000 |
| JP | 2002-264173 | 9/2002 |
| JP | 2005-212377 | 8/2005 |
| JP | 2006-002133 | 1/2006 |
| JP | 2006-045532 | 2/2006 |
| JP | 2006045532 A * | 2/2006 ................ C08J 9/32 |
| JP | 2006-282899 | 10/2006 |
| JP | 2007-191690 | 8/2007 |
| JP | 2008-133366 | 6/2008 |
| JP | 2009-120660 | 6/2009 |
| JP | 2009-161698 | 7/2009 |
| JP | 2009-203451 | 9/2009 |
| JP | 2009-221429 | 10/2009 |
| WO | 99/43758 | 9/1999 |
| WO | 03/099955 | 12/2003 |
| WO | 2004/074396 | 9/2004 |
| WO | 2007/074773 | 5/2007 |
| WO | 2007/072769 | 6/2007 |

OTHER PUBLICATIONS

Masahiko Yamagata, "Studies on characteristics of thermal expandable microcapsule "ADVANCELL® EM" and its use in weight reduction", Sekisui Chemical Co., Ltd., Specialty Chemicals Division, with partial translation thereof.

European Search Report issued Sep. 3, 2013 in corresponding European Application No. 09824672.1.

* cited by examiner

THERMALLY EXPANDABLE MICROCAPSULE AND FOAM-MOLDED ARTICLE

TECHNICAL FIELD

The present invention relates to a thermally expandable microcapsule, which shows excellent heat resistance and a high expansion ratio and thereby can be suitably used for molding processes involving high shearing force, such as kneading molding, calender molding, extrusion molding, and injection molding. The present invention also relates to a foamed product using the thermally expandable microcapsule.

BACKGROUND ART

Thermally expandable microcapsules have been used for various applications as a design-imparting agent or a weight-reducing agent. They have been also used for paint, such as foaming ink and wallpaper, to achieve weight reduction.

As such a thermally expandable microcapsule, widely known is one in which a thermoplastic shell polymer includes a volatile expansion agent that can change to a gas state at a softening temperature or lower of the shell polymer. Patent Document 1, for example, discloses a method for producing a thermally expandable microcapsule that includes a volatile expansion agent by adding an oily mixture and an oil-soluble polymerization catalyst to an aqueous dispersion medium that contains a dispersant with stirring to cause suspension polymerization. Here, the oil mixture is a mixture of a monomer and a volatile expansion agent with a low boiling point, such as an aliphatic hydrocarbon.

Although such a thermally expandable microcapsule obtained by this method is thermally expandable at a relatively low temperature of about 80 to 130° C., the expanded microcapsule bursts or contracts upon heating at a high temperature or a long period of time, and therefore the expansion ratio decreases. Accordingly, this method has a drawback in that a thermally expandable microcapsule having excellent heat resistance is difficult to produce.

Patent Document 2 discloses a method for producing a thermally expandable microcapsule that contains a polymer shell made from a polymerizable component containing 80 to 97% by weight of nitrile monomers, 3 to 20% by weight of non-nitrile monomers, and 0.1 to 1% by weight of a trifunctional crosslinking agent that includes a volatile expansion agent.

Patent Document 3 discloses a thermally expandable microcapsule that includes a volatile expansion agent with a polymer made from a polymerizable component containing 80% by weight or more of nitrile monomers, 20% by weight or less of non-nitrile monomers, and 0.1 to 1% by weight of a crosslinking agent. Here, the non-nitrile monomer is a methacrylic acid ester or acrylic ester.

These patent documents report that, compared with conventional microcapsules, thermally expandable microcapsules obtained by these methods shows excellent heat resistance and do not foam at 140° C. or lower. In fact, when the thermally expandable microcapsules are heated at 130 to 140° C. for about 1 minute, part of them are thermally expanded. Thus, it is difficult to produce thermally expandable microcapsules with excellent heat resistance, such as ones having a maximum foaming temperature of 180° C. or higher.

Patent Document 4 discloses a thermally expandable microcapsule that includes: a shell polymer of a homopolymer or copolymer of ethylenically-unsaturated monomers including 85% by weight or more of a nitrile group-containing monomer; and a foaming agent containing 50% by weight or more of isooctane. The thermally expandable microcapsule is produced to give a maximum foaming temperature of 180° C. or higher and desirably 190° C. or higher.

Although such a thermally expandable microcapsule shows a very high maximum foaming temperature, it is difficult to keep the expanded state. Thus, it is not suitable for prolonged use at a high temperature.

Patent Document 5 discloses a thermally expandable microcapsule that shows good foaming performance and improves in heat resistance in a broad range of foaming temperatures, especially at a high temperature (160° C. or higher) by specifying a monomer that forms the shell of the thermally expandable microcapsule. This thermally expandable microcapsule shows a high maximum foaming temperature. However, upon use in molding processes involving strong shearing force, such as kneading molding, calender molding, extrusion molding, and injection molding, especially for injection molding, deformation may arise because of some problems in heat resistance and strength of the thermally expandable microcapsule in melt kneading. Otherwise, the thermally expandable microcapsule may be crushed.

Patent Document 6 discloses a thermally expandable microcapsule in which a polymer obtainable by polymerizing a carboxyl group-containing monomer and a monomer having a group reactable with a carboxyl group is used as a shell. The patent document reports that such a thermally expandable microcapsule has increased three-dimensional crosslinking density. Therefore, it shows strong resistance to contraction, and marked improvement in heat resistance, with an even when the foamed shell is very thin.

However, such a method still leaves problems of heat resistance and strength. Thus, there is a limitation in the expansion ratios after molding such as injection molding.

Accordingly, it has been required to produce a thermally expandable microcapsule, which shows excellent heat resistance and a high expansion ratio, and is less likely to cause deformation, and is suitably used for molding processes involving strong shearing force, such as kneading molding, calender molding, extrusion molding, and injection molding.

Patent Document 1: Japanese Kokai Publication S42-26524 (JP-A S42-26524)
Patent Document 2: Japanese Kokai Publication H5-15499 (JP-A H5-15499)
Patent Document 3: Japanese Patent No. 2894990
Patent Document 4: EP 1149628
Patent Document 5: WO 2003/099955
Patent Document 6: WO 1999/43758

DISCLOSURE OF THE INVENTION

Problems to be Solved by the Invention

The present invention has its object to provide a thermally expandable microcapsule, which shows excellent heat resistance and a high expansion ratio and thereby can be suitably used for molding processes involving high shearing force, such as kneading molding, calender molding, extrusion molding, and injection molding. The present invention also has its object to provide a foamed product using the thermally expandable microcapsule.

Means for Solving the Problems

The present invention relates to a thermally expandable microcapsule, which comprises: a shell made of a polymer;

and a volatile expansion agent as a core agent encapsulated in the shell, the storage elastic modulus (E') of the shell at a temperature of 200° C. and a frequency of 10 Hz being $1×10^5$ N/m² or more, the storage elastic modulus (E') of the shell at a temperature of 250° C. and a frequency of 10 Hz being $1×10^5$ N/m² or more, and a maximum displacement amount measured by thermomechanical analysis being 300 μm or more.

The present invention also relates to a thermally expandable microcapsule, which comprises a shell made of a polymer; and a volatile expansion agent as a core agent encapsulated in the shell, the storage elastic modulus (E') of the shell at a temperature of 200° C. and a frequency of 10 Hz being $1×10^5$ N/m² or more, the storage elastic modulus (E') of the shell at a temperature of 250° C. and a frequency of 10 Hz being $1×10^5$ N/m² or more, and an expansion ratio upon heating at a temperature of 200° C. for 1 minute being 20 times or more in volume.

Hereinafter, the present invention will be described in detail.

In the thermally expandable microcapsule of the present invention, the lower limit of the storage elastic modulus (E') of the shell at temperatures of 200° C. and 250° C. and a frequency of 10 Hz is $1×10^5$ N/m². If the storage elastic modulus (E') of the shell at temperatures of 200° C. and 250° C. and a frequency of 10 Hz is $1×10^5$ N/m² or more, the shell is presumably in a rubbery state that does not show fluidity at temperatures of 200° C. and 250° C. Thus, the shell strength is significantly improved. Such a thermally expandable microcapsule can be suitably used for molding processes involving high shearing force, such as kneading molding, calender molding, extrusion molding, and injection molding.

If the storage elastic modulus (E') of the shell at temperatures of 200° C. and 250° C. and a frequency of 10 Hz is less than $1×10^5$ N/m², the thermally expandable microcapsule bursts or contracts at a high temperature, and is not suitably used for molding processes, such as kneading molding, calender molding, extrusion molding, and injection molding. The desirable lower limit of the storage elastic modulus (E') of the shell at temperatures of 200° C. and 250° C. and a frequency of 10 Hz is $10^6$ N/m². The upper limit of the storage elastic modulus (E') of the shell at temperatures of 200° C. and 250° C. and a frequency of 10 Hz is not particularly limited, and is desirably $10^7$ N/m². More than the desirable upper limit of the storage elastic modulus (E') of the shell may cause the shell to excessively harden and results in deterioration of the foaming performance. Furthermore, the maximum displacement amount measured by thermomechanical analysis may not be 300 μm or larger.

The storage elastic modulus (E') of the shell at temperatures of 200° C. and 250° C. and a frequency of 10 Hz may be measured by a tensile method with a dynamic mechanical analyzer. Sheet-shaped test pieces are prepared from the material of the shell of the thermally expandable microcapsule of the present invention.

The lower limit of the maximum displacement amount (Dmax) of the thermally expandable microcapsule of the present invention measured by thermomechanical analysis is 300 μm. A maximum displacement amount of less than 300 μm causes a low expansion ratio, and a desired foaming performance is not obtained. The desirable lower limit is 400 μm.

The maximum displacement amount refers to a value of the maximum diameter of the whole of a predetermined amount of the thermally expandable microcapsule while a predetermined amount of the thermally expandable microcapsule is heated from an ordinary temperature.

The desirable lower limit of the maximum foaming temperature (Tmax) of the thermally expandable microcapsule of the present invention is 200° C. If the maximum foaming temperature is lower than 200° C., the thermally expandable microcapsule may be poor in heat resistance, and thus the microcapsule may burst and contract at a high temperature or in the molding process. In addition, the thermally expandable microcapsule may foam due to shearing upon use as masterbatch pellets. Thus, an unfoamed masterbatch pellet cannot be stably produced. The more desirable lower limit thereof is 210° C.

The desirable upper limit of the foaming starting temperature (Ts) is 180° C. If it exceeds 180° C. especially in the case of injection molding, the resin temperature is cooled in a core back-foaming process, and the expansion ratio may not increase, in a core back foaming technique in which a resin material is fully charged in a die and thereafter the die volume is expanded in order to allow the resin material to foam in a desired size. The more desirable lower limit thereof is 130° C., and the desirable upper limit thereof is 160° C.

The maximum foaming temperature used herein refers to a temperature at which the diameter of the thermally expandable microcapsule reaches the maximum displacement amount while the thermally expandable microcapsule is heated from an ordinary temperature.

In the thermally expandable microcapsule according to the present invention, the ratio tan δ of the storage elastic modulus (G') to the loss elastic modulus (G") of the shell at a temperature of 200° C. and a frequency of 10 Hz is desirably 0.4 or less, and the ratio tan δ of the storage elastic modulus (G') to the loss elastic modulus (G") of the shell at a temperature of 200° C. and a frequency of 0.01 Hz is desirably 0.4 or less.

In the thermally expandable microcapsule of the present invention, the ratio tan δ of the storage elastic modulus (G') to the loss elastic modulus (G") of the shell at a temperature of 200° C. and frequencies of 10 Hz and 0.01 Hz is desirably 0.4 or less. The ratio tan δ of the storage elastic modulus (G') to the loss elastic modulus (G") is a value that is regarded as an energy absorption index. If the ratio tan δ is 0.4 or less in the present invention, the energy absorption is high even at a high temperature, and the thermally expandable microcapsule tends not to burst or contract. A low frequency of 0.01 Hz means that measurement is made at higher temperatures. The upper limit of the ratio tan δ of the storage elastic modulus (G') to the loss elastic modulus (G") of the shell even at a frequency of 0.01 Hz of 0.4 means that microcapsules tend not to burst nor contract at higher temperatures. If the ratio tan δ of the storage elastic modulus (G') to the loss elastic modulus (G") of the shell at a temperature of 200° C. and frequencies of 10 Hz and 0.01 Hz exceeds 0.4, the energy absorption is low, and the thermally expandable microcapsule cannot be suitably used for molding processes involving high shearing force, such as kneading molding, calender molding, extrusion molding, and injection molding.

The ratio tan δ of the storage elastic modulus (G') to the loss elastic modulus (G") of the shell at a temperature of 200° C. and frequencies of 10 Hz and 0.01 Hz may be measured with a rotational vibration type parallel-plate rheometer by a shearing method, for example. Sheet-shaped test pieces are prepared from only the shell of the thermally expandable microcapsule of the present invention by a hot pressing machine.

In the thermally expandable microcapsule according to the present invention, the desirable lower limit of the storage elastic modulus (G') of the shell at a temperature of 200° C. and a frequency of 10 Hz is $1×10^5$ N/m², and the desirable lower limit of the storage elastic modulus (G') of the shell at a temperature of 200° C. and a frequency of 0.01 Hz is $1\times10^4$ N/m$^2$. If the storage elastic modulus (G') of the shell at a temperature of 200° C. and a frequency of 10 Hz is $1\times10^5$ N/m$^2$ or more, and the storage elastic modulus (G') of the shell at a frequency of 0.01 Hz is $1\times10^4$ N/m$^2$ or more, the shell is presumably in a rubber state which does not show fluidity at a temperature of 200° C. Thus, the thermally expandable microcapsule can be suitably used for molding processes involving high shearing force, such as kneading molding, calender molding, extrusion molding, and injection molding. In particular, the less the difference of elastic moduli at frequencies of 10 Hz and 0.01 Hz is, the more uniformly rubbers are crosslinked. If the storage elastic modulus (G') of the shell at a temperature of 200° C. and a frequency of 10 Hz is less than $1\times10^5$ N/m$^2$, and the storage elastic modulus (G') of the shell at a frequency of 0.01 Hz is less than $1\times10^4$ N/m$^2$, the thermally expandable microcapsule bursts or contracts at a high temperature, and the thermally expandable microcapsule may not be suitably used for molding processes, such as kneading molding, calender molding, extrusion molding, and injection molding. The more desirable lower limit of the storage elastic modulus (G') of the shell at a temperature of 200° C. and a frequency of 10 Hz is $1\times10^6$ N/m$^2$, and the more desirable lower limit of the storage elastic modulus (G') of the shell at a temperature of 200° C. and a frequency of 0.01 Hz is $1\times10^5$ N/m$^2$. The upper limit of the storage elastic modulus (G') of the shell at a temperature of 200° C. and frequencies of 10 Hz and 0.01 Hz is not particularly limited as long as the maximum displacement amount measured by thermomechanical analysis is 300 μm or more.

The storage elastic modulus (G') of the shell at a temperature of 200° C. and frequencies of 10 Hz and 0.01 Hz can be measured with a rotational vibration type parallel-plate rheometer by a shearing method, for example. Sheet-shaped test pieces are prepared from only the shell of the thermally expandable microcapsule of the present invention by a hot pressing machine.

A second embodiment of the present invention is a thermally expandable microcapsule, which comprises a shell made of a polymer; and a volatile expansion agent as a core agent encapsulated in the shell, the storage elastic modulus (E') of the shell at a temperature of 200° C. and a frequency of 10 Hz being $1\times10^5$ N/m$^2$ or more, the storage elastic modulus (E') of the shell at a temperature of 250° C. and a frequency of 10 Hz being $1\times10^5$ N/m$^2$ or more, and an expansion ratio upon heating at a temperature of 200° C. for 1 minute being 20 times or more in volume.

Herein, one embodiment and another embodiment of the present invention are both simply referred to as the invention unless it is necessary to differentiate one from another.

In the thermally expandable microcapsule according to the second embodiment of the present invention, the expansion ratio upon heating at a temperature of 200° C. for 1 minute is 20 times or more in volume. If the expansion ratio is less than 20 times in volume, foaming properties are deteriorated. It is thus impossible to impart such performances as lightness, heat insulation, and shock resistance to a molded product to be obtained. The expansion ratio is desirably 30 times or more.

The thermally expandable microcapsule according to the present invention includes a shell made of a polymer; and a volatile expansion agent as a core agent encapsulated in the shell. The shell desirably comprises a polymer obtainable by polymerizing a monomer mixture that contains 95% by weight or more of (meth)acrylonitrile, the (meth)acrylonitrile containing 70% by weight or more of acrylonitrile. The degree of crosslinkage of the shell is desirably 60% by weight or more. The term "(meth)acrylonitrile" used herein expresses acrylonitrile or methacrylonitrile.

In the monomer mixture, the desirable lower limit of the amount of acrylonitrile in (meth)acrylonitrile is 70% by weight. If the amount of acrylonitrile is less than 70% by weight, gas barrier properties and the storage elastic modulus (E') of the shell may be deteriorated, likely resulting in reduction in the expansion ratio.

The lower limit of the amount of (meth)acrylonitrile in the monomer mixture is desirably 95% by weight, and more desirably 98% by weight. If the amount of (meth)acrylonitrile in the monomer mixture is less than 95% by weight, the storage elastic modulus (E') of the shell, especially at 250° C., is lowered, and may be out of the range specified herein. Reduction in the gas barrier property of the shell may reduce the expansion ratio. If the amount of (meth)acrylonitrile is 95% by weight or more, a cyclization reaction between nitrile groups may cause heating and the shell may be hardened. Consequently, a storage elastic modulus or the like properties would become high.

The desirable lower limit of the degree of crosslinkage of the shell is 60% by weight. If the degree of crosslinkage is less than 60% by weight, the storage elastic modulus (E') of the shell especially at 250° C. is lowered, likely resulting in reduction in the expansion ratio.

The degree of crosslinkage means % by weight of undissolved materials remaining in a mixture of a polymer of the thermally expandable microcapsule and a solvent. Specifically, an acrylonitrile polymer is dissolved in a solvent, N,N-dimethylformamide, and then % by weight of undissolved matter in the polymer is determined.

The shell desirably comprises a polymer obtainable by polymerizing a monomer mixture which contains: 30 to 70% by weight of at least one polymerizable monomer (I) selected from the group consisting of acrylonitrile, methacrylonitrile, and vinylidene chloride; and 5 to 40% by weight of a radically-polymerizable unsaturated $C_{3-8}$ carboxylic acid monomer (II) having a carboxyl group; and a polymerizable monomer (III) having two or more double bonds in a molecule.

The polymerizable monomer (I) is at least one selected from the group consisting of acrylonitrile, methacrylonitrile, and vinylidene chloride.

Addition of the polymerizable monomer (I) can improve gas barrier properties of the shell.

The desirable lower limit of the amount of the polymerizable monomer (I) in the monomer mixture is 30% by weight, and the desirable upper limit thereof is 70% by weight. If the amount of the polymerizable monomer (I) in the monomer mixture is less than 30% by weight, the shell may have poor gas barrier properties, likely resulting in reduction in the expansion ratio. An amount of the polymerizable monomer (I) in the monomer mixture exceeding 70% by weight may not increase heat resistance. The more desirable lower limit of the amount of the polymerizable monomer (I) in the monomer mixture is 40% by weight, and the more desirable upper limit thereof is 60% by weight.

As the radically-polymerizable unsaturated $C_{3-8}$ carboxylic acid monomer (II) having a carboxyl group, a monomer having one or more free carboxyl groups per molecule for ionic crosslinking may be used. Specific examples thereof include unsaturated monocarboxylic acids, such as acrylic acid, methacrylic acid, ethacrylic acid, crotonic acid, and cinnamic acid; unsaturated dicarboxylic acids, such as maleic acid, itaconic acid, fumaric acid, citraconic acid, and chloromaleic acid, and anhydrides thereof; and monoesters of unsaturated dicarboxylic acids, such as monomethyl maleate, monoethyl maleate, monobutyl maleate, monomethyl fumarate, monoethyl fumarate, monomethyl itaconate, monoethyl itaconate, and monobutyl itaconate, and derivatives thereof. These may be used independently, or two or more thereof may be used in combination. Particularly desirable among these are acrylic acid, methacrylic acid, maleic acid, maleic anhydride, and itaconic acid.

The amount of the radically-polymerizable unsaturated $C_{3-8}$ carboxylic acid monomer (II) having a carboxyl group in the monomer mixture is desirably 5% by weight in the lower limit, and 40% by weight in the upper limit. If the amount of the radically-polymerizable unsaturated $C_{3-8}$ carboxylic acid monomer (II) is less than 5% by weight, the maximum foaming temperature may be 180° C. or less. When the amount of the radically-polymerizable unsaturated $C_{3-8}$ carboxylic acid monomer (II) is more than 40% by weight, the maximum foaming temperature is increased, but the expansion ratio is reduced. More desirably, the amount of the radically-polymerizable unsaturated carboxylic acid monomer (II) in the monomer mixture is 10% by weight in the lower limit, and 30% by weight in the upper limit.

The monomer mixture contains a polymerizable monomer (III) having two or more double bonds in a molecule. The polymerizable monomer (III) serves as a crosslinking agent. The monomer mixture containing the polymerizable monomer (III) strengthens the shell, and is less likely to cause cell walls to burst upon thermal expansion. It has been found that addition of the polymerizable monomer (III) avoids reduction in the storage elastic modulus (G' or E') especially on a low-frequency side.

Examples of the polymerizable monomer (III) include a monomer having two or more radically-polymerizable double bonds. Specific examples thereof include divinylbenzene, ethylene glycol di(meth)acrylate, diethylene glycol di(meth)acrylate, triethylene glycol di(meth)acrylate, propylene glycol di(meth)acrylate, 1,4-butanediol di(meth)acrylate, 1,6-hexanediol di(meth)acrylate, 1,9-nonanediol di(meth)acrylate, polyethylene glycol di(meth)acrylate having a weight-average molecular weight of 200 to 600, glycerin di(meth)acrylate, trimethylolpropane di(meth)acrylate, trimethylolpropane tri(meth)acrylate, ethyleneoxide-modified trimethylolpropane tri(meth)acrylate, pentaerythritol tri(meth)acrylate, triallyl formal tri(meth)acrylate, pentaerythritol tetra(meth)acrylate, dipentaerythritol hexa(meth) acrylate, and dimethylol-tricyclodecane di(meth)acrylate. Of these, bifunctional monomers such as polyethylene glycol are suitably used because thermally expanded microcapsules are less likely to contract even at a high temperature exceeding 200° C. and tend to keep the expanded state. Thus, such monomers suppress deformation. Particularly desirable among these is triethylene glycol diacrylate or polyethylene glycol diacrylate that has a weight-average molecular weight of 200 to 600.

In the monomer mixture, the desirable lower limit of the amount of the polymerizable monomer (III) is 0.05% by weight, and the desirable upper limit thereof is 3% by weight. The polymerizable monomer (III) in an amount of less than 0.05% by weight may not serve as a crosslinking agent. More than 3% by weight of the polymerizable monomer (III) causes the particle shape of the thermally expandable microcapsule to be distorted, resulting in reduction in bulk specific gravity. The desirable lower limit of the amount of the polymerizable monomer (III) is 0.1% by weight, and the more desirable upper limit thereof is 1% by weight.

The monomer mixture desirably further contains the metal cation hydroxide (IV).

When the monomer mixture contains the metal cation hydroxide (IV), the metal cation hydroxide (IV) is ionically bound with the carboxyl group of the radically-polymerizable unsaturated carboxylic acid monomer (II). Thus, rigidity and heat resistance of the shell may be increased. Especially, the storage elastic modulus (E') and storage elastic modulus (G') of the shell at a temperature of 200° C. and a frequency of 10 Hz can be increased. Consequently, it is possible to produce a thermally expandable microcapsule which neither bursts nor contracts for a long period of time at a high temperature. Since the elastic modulus of the shell is less likely to decrease even at a high temperature, a thermally expandable microcapsule neither bursts nor contracts even upon performing molding processes involving high shearing force, such as kneading molding, calender molding, extrusion molding, and injection molding.

The metal cation of the metal cation hydroxide (IV) is not particularly limited as long as it reacts with the radically-polymerizable unsaturated carboxylic acid monomer (II) and is ionically bound therewith. Examples thereof include ions of metals such as Na, K, Li, Zn, Mg, Ca, Ba, Sr, Mn, Al, Ti, Ru, Fe, Ni, Cu, Cs, Sn, Cr, and Pb. However, the object of the addition of the metal cation hydroxide (IV) in this case is to ionically bind the metal cation with the radically-polymerizable unsaturated carboxylic acid monomer (II). Thus, the metal cation needs to be hydroxide, and chlorides, such as NaCl, are not suitable because they form mere a weak ionic bond. Of these, the ions of Ca, Zn, and Al, which are divalent or trivalent metal cations, are desirable, and the ion of Zn is particularly desirable. These metal cation hydroxides (IV) may be used independently or two or more thereof may be used in combination.

In the monomer mixture, the desirable lower limit of the amount of the metal cation hydroxide (IV) is 0.1% by weight, the desirable upper limit thereof is 10% by weight. The amount of the metal cation hydroxide (IV) of less than 0.1% by weight may result in insufficient heat resistance, whereas the amount of the metal cation hydroxide (IV) exceeding 10% by weight may markedly deteriorate the expansion ratio. The more desirable lower limit of the amount of the metal cation hydroxide (IV) is 0.5% by weight, and the more desirable upper limit thereof is 5% by weight.

The monomer mixture may contain other monomers as well as the polymerizable monomer (I), and the radically-polymerizable unsaturated carboxylic acid monomer (II). Examples of other monomers include acrylates such as methyl acrylate, ethyl acrylate, butyl acrylate, and dicyclopentenyl acrylate; methacrylates such as methyl methacrylate, ethyl methacrylate, butyl methacrylate, and isobornyl methacrylate; and vinyl monomers such as vinyl chloride, vinylidene chloride, vinyl acetate, and styrene. These other monomers may be suitably selected according to the characteristics required for the thermally expandable microcapsules. Desirable among these are methyl methacrylate, ethyl methacrylate, and methyl acrylate. The total amount of other monomers in all the monomers forming the shell is desirably less than 10% by weight. The amount of other monomers exceeding 10% by weight undesirably tends to cause reduction in gas barrier properties, and thus to deteriorate thermal expansion.

In order to polymerize the aforementioned monomers, the monomer mixture contains a polymerization initiator.

Suitable examples of the polymerization initiator include dialkyl peroxides, diacyl peroxides, peroxyesters, peroxydicarbonates, and azo compounds. Specific examples thereof include dialkyl peroxides such as methyl ethyl peroxide, di-t-butyl peroxide, and dicumyl peroxide; diacyl peroxides such as isobutyl peroxide, benzoyl peroxide, 2,4-dichlorobenzoyl peroxide, 3,5,5-trimethylhexanoyl peroxide; peroxyesters such as t-butyl peroxypivalate, t-hexyl peroxypivalate, t-butyl peroxyneodecanoate, t-hexyl peroxyneodecanoate, 1-cyclohexyl-1-methylethyl peroxyneodecanoate, 1,1,3,3-tetramethylbutyl peroxyneodecanoate, cumyl peroxyneodecanoate, and (α,α-bis-neodecanoylperoxy)diisopropylbenzene; peroxydicarbonates such as bis(4-t-butyl cyclohexyl)peroxy dicarbonate, di-n-propyl-oxydicarbonate, di-isopropyl peroxydicarbonate, di(2-ethylethylperoxy)dicarbonate, dimethoxybutyl peroxy dicarbonate, and di(3-methyl-3-methoxybutylperoxy)dicarbonate; and azo compounds such as 2,2'-azobisisobutyronitrile, 2,2'-azobis(4-methoxy-2,4-dimethylvaleronitrile), 2,2'-azobis(2,4-dimethylvaleronitrile), and 1,1'-azobis-(1-cyclohexanecarbonitrile).

The desirable lower limit of the weight-average molecular weight of the polymer that forms the shell is 100,000, and the desirable upper limit thereof is 2,000,000. The weight-average molecular weight of less than 100,000 may cause low strength of the shell whereas the weight-average molecular weight exceeding 2,000,000 may cause extremely high strength of the shell, likely resulting in reduction in the expansion ratio.

If necessary, the shell may further contain a stabilizer, an ultraviolet absorber, an antioxidant, an antistatic agent, a flame retardant, a silane coupling agent, a coloring agent, or the like.

The thermally expandable microcapsule according to the present invention comprises a shell and a volatile expansion agent as a core agent encapsulated in the shell.

The volatile expansion agent is a substance that can change to a gas state at the softening temperature or lower of the polymer that forms the shell. A low-boiling-point organic solvent is suitable as the volatile expansion agent.

Examples of the volatile expansion agent include low molecular-weight hydrocarbons such as ethane, ethylene, propane, propene, n-butane, isobutane, butene, isobutene, n-pentane, isopentane, neopentane, n-hexane, heptane, and petroleum ether; chlorofluorocarbons such as $CCl_3F$, $CCl_2F_2$, $CClF_3$, and $CClF_2$—$CClF_2$; and tetraalkylsilanes such as tetramethylsilane, trimethylethylsilane, trimethylisopropylsilane, and trimethyl-n-propylsilane. Desirable among these are isobutane, n-butane, n-pentane, isopentane, n-hexane, petroleum ether, and mixtures thereof. These volatile expansion agents may be used independently, or two or more thereof may be used in combination.

Of the above-mentioned volatile expansion agents, a low-boiling-point hydrocarbon having five or less carbon atoms is desirably used in the thermally expandable microcapsule according to the present invention. Such a hydrocarbon provides a thermally expandable microcapsule that has a high expansion ratio and immediately starts foaming rapidly.

The thermally decomposable compound, which is thermally decomposed by heating to become a gas, may be used as a volatile expansion agent.

In the thermally expandable microcapsule of the present invention, the desirable lower limit of the amount of the volatile expansion agent used as a core agent is 10% by weight, and the desirable upper limit thereof is 25% by weight.

The thickness of the shell changes with the amount of the core agent. When the amount of the core agent is reduced and the shell becomes too thick, foaming performance is deteriorated. When the amount of the core agent is increased, the strength of the shell is decreased. When the amount of the core agent is 10 to 25% by weight, it is possible to simultaneously prevent deformation and improve foaming performance of a thermally expandable microcapsule.

The desirable lower limit of the volume average particle diameter of the thermally expandable microcapsules according to the present invention is 5 μm, and the desirable upper limit thereof is 100 μm. When the volume average particle diameter is less than 5 μm, bubbles in the molded body to be obtained are so small that reduction in weight of the molded body may be insufficient. When the volume average particle diameter exceeds 100 μm, bubbles of the molded body to be obtained are so large that problems may arise in terms of properties such as strength. The more desirable lower limit of the volume average particle diameter is 10 μm, and the more desirable upper limit thereof is 40 μm.

The method for producing the thermally expandable microcapsule according to the present invention is not particularly limited. For example, the thermally expandable microcapsule may be produced by the steps of: preparing an aqueous medium; dispersing, in the aqueous medium, an oily mixture containing 30 to 70% by weight of at least one polymerizable monomer (I) selected from the group consisting of acrylonitrile, methacrylonitrile, and vinylidene chloride, 5 to 40% by weight of the $C_{3-8}$ radically-polymerizable unsaturated carboxylic acid monomer (II) having a carboxyl group, a polymerizable monomer (III) having two or more double bonds in a molecule, and a volatile expansion agent; and polymerizing the monomers.

Upon producing the thermally expandable microcapsule according to the present invention, the step of preparing an aqueous medium is first performed. Specifically, for example, water and a dispersion stabilizer, and an auxiliary stabilizer if necessary, are put in a polymerization vessel to prepare an aqueous dispersion medium containing a dispersion stabilizer. Alkali metal salts of nitrous acid, stannous chloride, stannic chloride, potassium dichromate, and the like may be added therein as needed.

Examples of the dispersion stabilizer include silica, calcium phosphate, magnesium hydroxide, aluminum hydroxide, ferric hydroxide, barium sulfate, calcium sulfate, sodium sulfate, calcium oxalate, calcium carbonate, calcium carbonate, barium carbonate, and magnesium carbonate.

The amount of the dispersion stabilizer is not particularly limited and appropriately determined by the kind of dispersion stabilizer, a particle diameter of the microcapsule, and the like. The desirable lower limit thereof is 0.1 parts by weight, and the desirable upper limit thereof is 20 parts by weight, with respect to 100 parts by weight of the monomers.

Examples of the auxiliary stabilizer include a condensation product of diethanolamine and aliphatic dicarboxylic acid, a condensation product of urea and formaldehyde, polyvinyl pyrrolidone, polyethylene oxide, polyethylene imine, tetramethylammonium hydroxide, gelatin, methyl cellulose, polyvinyl alcohol, dioctyl sulfosuccinate, sorbitan ester, and various emulsifiers.

In addition, combinations of the dispersion stabilizer and the auxiliary stabilizer are not particularly limited, and examples thereof include a combination of colloidal silica and a condensation product, a combination of colloidal silica and a water-soluble nitrogen-containing compound, and a combination of magnesium hydroxide or calcium phosphate and an emulsifier. Of them, the combination of colloidal silica and a condensation product is desirable.

Further, as the condensation product, a condensation product of diethanolamine and aliphatic dicarboxylic acid is desirable, and a condensation product of diethanolamine and adipic acid and a condensation product of diethanolamine and itaconic acid are particularly desirable.

Examples of the water-soluble nitrogen-containing compound include polyvinylpyrrolidone, polyethyleneimine, polyoxyethylene alkylamine, polydialkylaminoalkyl(meth) acrylates typified by polydimethylaminoethylmethacrylate and polydimethylaminoethylacrylate, polydialkylaminoalkyl(meth)acrylamides typified by polydimethylaminopropylacrylamide and polydimethylaminopropylmethacrylamide, polyacrylamide, polycationic acrylamide, polyaminesulfone, and polyallylamine. Of them, polyvinylpyrrolidone is desirably used.

The amount of the colloidal silica is appropriately determined by the particle diameter of the thermally expandable microcapsule. The desirable lower limit thereof is 1 part by weight, and the desirable upper limit thereof is 20 parts by weight, with respect to 100 parts by weight of vinyl monomers. The more desirable lower limit of the amount of the colloidal silica is 2 parts by weight, and the more desirable upper limit thereof is 10 parts by weight. In addition, the amount of the condensation product or the water-soluble nitrogen-containing compound is also appropriately determined by the particle diameter of the thermally expandable microcapsule. The desirable lower limit thereof is 0.05 parts by weight, and the desirable upper limit thereof is 2 parts by weight, with respect to 100 parts by weight of the monomers.

In addition to the dispersion stabilizer and the auxiliary stabilizer, inorganic salts such as sodium chloride and sodium sulfate may be added. Addition of the inorganic salts provides thermally expandable microcapsules each having a more uniform particle shape. Normally, the amount of the inorganic salt is desirably 0 to 100 parts by weight with respect to 100 parts by weight of the monomers.

The aqueous dispersion medium containing the dispersion stabilizer is prepared by blending a dispersion stabilizer and an auxiliary stabilizer with deionized water. The pH of the water phase in this case is appropriately determined by the kind of dispersion stabilizer and auxiliary stabilizer to be used. For example, if silica such as colloidal silica is used as a dispersion stabilizer, polymerization is performed in an acidic medium. Otherwise, if an aqueous medium is to be acidified, an acid such as hydrochloric acid is added according to need, to adjust the pH of the system within the range of 3 to 4. Meanwhile, upon use of magnesium hydroxide or calcium phosphate, polymerization is performed in an alkaline medium.

The following step in the method for producing a thermally expandable microcapsule is a step of dispersing, in the aqueous medium, an oily mixture containing 30 to 70% by weight of at least one polymerizable monomer (I) selected from the group consisting of acrylonitrile, methacrylonitrile, and vinylidene chloride, 5 to 40% by weight of the $C_{3-8}$ radically-polymerizable unsaturated carboxylic acid monomer (II) having a carboxyl group, a polymerizable monomer (III) having two or more double bonds in a molecule, and the volatile expansion agent. In this step, the oily mixture may be prepared in the aqueous dispersion medium by separately adding monomers and a volatile inflating agent to the aqueous dispersion medium. However, both are usually mixed beforehand to produce an oily mixture, and subsequently added to an aqueous dispersion medium. In this case, the oily mixture and the aqueous dispersion medium may be prepared beforehand in two separate containers. Then, the oily mixture and aqueous dispersion medium are mixed with stirring in another container to prepare a dispersion of the oily mixture in the aqueous dispersion medium. The thus-prepared dispersion is then added to a polymerization vessel.

Here, a polymerization initiator is used for polymerizing the monomers. The polymerization initiator may be added to the oily mixture beforehand, or may be added thereto after stirring and mixing the aqueous dispersion medium and the oily mixture in the polymerization vessel.

The oily mixture may be emulsion-dispersed in an aqueous dispersion medium with a predetermined particle diameter by, for example, stirring the oily mixture and the medium with a homomixer (a homomixer produced by PRIMIX Corporation, for example) or introducing the oily mixture and the medium into a static dispersion apparatus such as a line mixer and an element-type static dispersion machine.

The aqueous dispersion medium and the polymerizable mixture may be separately supplied to the static dispersion apparatus, or they may be mixed and stirred beforehand to form a dispersion, and then the dispersion may be supplied thereto.

The thermally expandable microcapsule according to the present invention can be produced by heating the dispersion obtained through the aforementioned process to thereby polymerize monomers, for example. The thermally expandable microcapsule produced by such a method has a high maximum foaming temperature, excels in heat resistance, and neither bursts nor contracts at a high temperature or in the molding process.

A foamed product can be produced by charging a resin composition which contains the thermally expandable microcapsules of the present invention and a matrix resin such as a thermoplastic resin, or a resin composition which contains a masterbatch pellet including the thermally expandable microcapsules and a base resin, and a matrix resin such as a thermoplastic resin, then molding an article by a molding method such as injection molding, and heating the article, during the process of molding, to make the thermally expandable microcapsules foam, to thereby produce a foamed product. Such a foamed product is also one aspect of the present invention.

The foamed product of the present invention obtained by such a method has a good appearance. Closed cells are uniformly formed therein. The foamed product excels in properties such as lightness, heat insulation, shock resistance, and rigidity, and thus may be suitably used for applications such as building materials for residence, members for automobiles, and shoe soles.

The matrix resin, such as the thermoplastic resin, is not particularly limited as long as it does not provide any adverse effect for attaining the object of the present invention. Examples thereof include general thermoplastic resins such as polyvinyl chloride, polystyrene, polypropylene, polypropylene oxide, and polyethylene; and engineering plastics such as polybutylene terephthalate, nylon, polycarbonate, and polyethylene terephthalate. Thermoplastic elastomers such as ethylene elastomers, vinyl chloride elastomers, olefin elastomers, urethane elastomers, and ester thermoplastic elastomers, may also be used. Alternatively, these resins may be used in combination.

The amount of the thermally expandable microcapsule according to the present invention is 0.5 to 20 parts by weight, and desirably 1 to 10 parts by weight to 100 parts by weight of the thermoplastic resin. The thermally expandable microcapsule may also be used together with chemical foaming agents, such as sodium bicarbonate and ADCA (azodicarbonamide).

The method for producing the masterbatch is not particularly limited. Examples thereof include a method in which raw materials including a base resin such as a thermoplastic resin and additives such as a lubricant, are kneaded beforehand with an apparatus such as a same-direction twin-screw extruder; the mixture is heated to a predetermined temperature; foaming agents such as thermally expandable microcapsules of the present invention are added thereto; the mixture is further kneaded to provide a resultant mixture; and the resultant mixture is cut into a pellet shape having a desired size with a pelletizer to give a masterbatch pellet.

The base resin such as the thermoplastic resin is not particularly limited, and conventionally widely used base resin may be used. Example of the thermoplastic resin include typical thermoplastic resins such as polyvinyl chloride, polypropylene, polypropylene oxide, low-density polyethylene, high-density polyethylene, polystyrene, ethylene-vinyl acetate copolymers, and ethylene-methyl methacrylate copolymers; and engineering plastics such as polybutylene terephthalate, nylon, polycarbonate, and polyethylene terephthalate. Thermoplastic elastomers such as ethylene elastomers, vinyl chloride elastomers, olefin elastomers, urethane elastomers, and ester thermoplastic elastomers, may be used. Alternatively, these resins may be used in combination. Desirable among these is at least one selected from the group consisting of low-density polyethylene, high-density polyethylene, polypropylene, and polystyrene.

The masterbatch may be alternatively produced by a method, including kneading raw materials including a base resin such as a thermoplastic resin, thermally expandable microcapsules, and a lubricant with a batch-type kneader, subsequent granulating the mixture with a granulator, to produce a masterbatch pellet in a pellet shape.

The kneader is not particularly limited as long as it is able to knead the raw materials without breaking the thermally expandable microcapsules. Examples thereof include a pressurizing kneader and a Banbury mixer.

The method for molding a foamed product of the present invention is not particularly limited, and examples thereof include kneading molding, calender molding, extrusion molding, and injection molding. Methods of injection molding are not particularly limited. Examples of the methods include a short-shot method in which part of a resin material is charged in a mold and then foamed, and a core back method in which a resin material is fully charged in a die and thereafter the die volume is expanded in order to allow the resin material to foam in a desired size.

Effects of the Invention

According to the present invention, it is possible to provide a thermally expandable microcapsule, which shows excellent heat resistance and a high expansion ratio and thereby can be suitably used for molding processes involving high shearing force, such as kneading molding, calender molding, extrusion molding, and injection molding.

MODE FOR CARRYING OUT THE INVENTION

Hereinafter, the present invention will be described in further detail referring to the following examples. The present invention is not limited to these examples.

Examples 1 to 6, and Comparative Examples 1 to 8

(Production of Thermally Expandable Microcapsule)

300 parts by weight of water, 89 parts by weight of sodium chloride as a regulator, 0.07 parts by weight of sodium nitrite as a water-soluble polymerization inhibitor, 8 parts by weight of colloidal silica (produced by ADEKA CORPORATION), and 0.3 parts by weight of polyvinylpyrrolidone (produced by BASF SE) as a dispersion stabilizer were charged in a polymerization vessel to prepare an aqueous dispersion medium. Subsequently, an oily mixture containing metal cation hydroxide, monomers, volatile expansion agents, and polymerization initiators, each in an amount shown in Table 1, were added to the aqueous dispersion medium to prepare a dispersion. The total amount of the dispersion was 15 kg. The obtained dispersion was stirred and mixed with a homogenizer. The dispersion was fed into a nitrogen-substituted pressure polymerization vessel (20 L). Pressure was applied thereto (0.2 MPa), and the dispersion was reacted at 60° C. for 20 hours to prepare a reaction product. The resultant product was dehydrated and water-washed repeatedly in a centrifugal separator, followed by drying to produce thermally expandable microcapsules.

In Table 1, a radically-polymerizable unsaturated $C_{3-8}$ carboxylic acid monomer (II) having a carboxyl group is indicated as monomer (II).

(Production of Masterbatch Pellet)

A masterbatch pellet was obtained by kneading 100 parts by weight of powder and pellet low-density polyethylene and 0.2 parts by weight of ethylene bis-stearic acid amide as a lubricant with a Banbury mixer; adding, when the temperature reached about 140° C., 50 parts by weight of the thermally expandable microcapsules each in an amount shown in Table 1; then kneading the mixture for further 30 seconds; and extruding the resultant mixture while palletizing, to produce the materbatch pellet.

(Production of Molded Body)

A plate-like molded body was obtained by mixing a masterbatch pellet in an amount shown in Table 2 with 100 parts by weight of polypropylene resin; charging the obtained mixed pellet into a hopper of a screw-type injection molding apparatus provided with an accumulator; melting and kneading the charged pellet therein; and injection molding the kneaded pellet. The molding conditions were a temperature of the cylinder of 250° C., and an injection speed of 60 mm/sec, a delay time of die opening of 0 second, and a die temperature of 60° C.

(Evaluation)

The thermally expandable microcapsules and molded bodies obtained in Examples 1 to 6 and Comparative Examples 1 to 8 were evaluated for the following performances. Tables 1 and 2 show the results.

(1) Evaluation of Thermally Expandable Microcapsule
(1-1) Volume Average Particle Diameter The volume average particle diameter of each microcapsule was measured with a particle size distribution analyzer (LA-910, produced by HORIBA, Ltd.).

(1-2) Foaming Starting Temperature, Maximum Foaming Temperature, and Maximum Displacement Amount The foaming starting temperature (Ts), the maximum displacement amount (Dmax), and the maximum foaming temperature (Tmax) were measured with a thermomechanical analyzer (TMA) (TMA2940, produced by TA instruments). Specifically, 25 μg of a test sample was put in an aluminum container with a diameter of 7 mm and a depth of 1 mm, and heated from 80° C. to 220° C. at a temperature-rise rate of 5° C./min with a force of 0.1 N applied from the top. Thus, displacement was measured in a perpendicular direction of a measuring terminal. The temperature at which the displacement began to increase was defined as the foaming starting temperature. The maximum value of the displacement was defined as the maximum displacement amount. The temperature at which the maximum displacement amount was measured was defined as the maximum foaming temperature.

(1-3) Measurement of Storage Elastic Modulus and Associated Properties

The obtained thermally expandable microcapsule is swollen by DMF (N,N-dimethylformamide), to thereby remove a volatile expansion agent included therein. Thereafter, the DMF was evaporated, a sheet was produced from a shell obtained with a hot press machine, and a test piece with a width of 5 mm, a length of 15 mm, and a thickness of 0.2 mm was produced.

The thermally expandable microcapsule was heated with a test piece under nitrogen atmosphere at a temperature-rise rate of 3° C./minute and a frequency of 10 Hz. Then, the storage elastic modulus (E') of the shell at a temperature of 200° C. and a frequency of 10 Hz and the storage elastic modulus (E') of the shell at a temperature of 250° C. and a frequency of 10 Hz were measured with a dynamic mechanical analyzer (Rheogel-E4000, produced by UBM).

The storage elastic modulus (G') and the loss elastic modulus (G") at a temperature of 200° C. and a frequency in the range of 0.01 to 10 Hz were measured with a dynamic mechanical analyzer (Rheosol-G5000, produced by UBM) with a parallel-plate. Then, the ratio tan δ of the storage elastic modulus (G') to the loss elastic modulus (G") of the shell at a temperature of 200° C. and a frequency of 10 Hz, and the ratio tan δ of the storage elastic modulus (G') to the loss elastic modulus (G") of the shell at a temperature of 200° C. and a frequency of 0.01 Hz were calculated.

(1-4) Measurement of Degree of Crosslinkage

A sample in which 29 g of N,N-dimethylformamide and 1 g of a thermally expandable microcapsule were weighed was put in a glass container, and the container was shaken for 24 hours to produce a swelling liquid. Thereafter, supernatant liquid was removed by centrifugal separation to separate gel matter. The gel matter was evaporated and dried in a 130° C. vacuum oven. The weight of dried gel was measured. The degree of crosslinkage was calculated by the following formula:

Degree of crosslinkage=[(gel dry weight)/(polymer weight of thermally expandable microcapsule in 1 g of sample)]×100

TABLE 1

| | | Examples | | | | | | Microcapsules No. | | Comparative Examples | | | | | | |
|---|---|---|---|---|---|---|---|---|---|---|---|---|---|---|---|---|
| | | 1 | 2 | 3 | 4 | 5 | 6 | 1 | 2 | 3 | 4 | 5 | 6 | 7 | 8 | |
| | | (1) | (2) | (3) | (4) | (5) | (6) | (7) | (8) | (9) | (10) | (11) | (12) | (13) | (14) | |
| Amount (parts by weight) | Polymerizable monomer (I) | Acrylonitrile | 70 | 30 | 13 | 13 | 13 | 0 | 50 | 50 | 13 | 13 | 30 | 13 | 13 | 50 |
| | | Methacrylonitrile | 30 | 40 | 23 | 23 | 23 | 0 | 50 | 50 | 23 | 23 | 40 | 23 | 23 | 37 |
| | Monomer (II) | Vinylidene chloride | 0 | 0 | 0 | 0 | 0 | 50 | 0 | 0 | 0 | 0 | 0 | 0 | 0 | 0 |
| | | Methacrylic acid | 0 | 20 | 34 | 34 | 34 | 30 | 0 | 0 | 34 | 34 | 20 | 34 | 34 | 3 |
| | Other monomer | Methyl methacrylate | 0 | 10 | 30 | 30 | 30 | 20 | 0 | 0 | 30 | 30 | 10 | 30 | 30 | 10 |
| | Polymerizable monomer (III) | Dipentaerythritol hexaacrylate | 0 | 0 | 0 | 0 | 0 | 0 | 0 | 0 | 0 | 0 | 0 | 0 | 0 | 0 |
| | | Triethylene glycol diacrylate | 0.4 | 0 | 0 | 0 | 0 | 0 | 0.4 | 0.05 | 0.6 | 0.6 | 0 | 0 | 0 | 0 |
| | | PEG#200 diacrylate | 0 | 3 | 1 | 0.6 | 0.6 | 0.6 | 0 | 0 | 0 | 0 | 0.05 | 0 | 0 | 0 |
| | Metal cation hydroxide (IV) | Zinc hydroxide | 0 | 0 | 1.5 | 0 | 0 | 1.5 | 0 | 0 | 1.5 | 1.5 | 0 | 0 | 1.5 | 0 |
| | | Aluminium hydroxide | 0 | 0 | 0 | 1.5 | 0 | 0 | 0 | 0 | 0 | 0 | 0 | 0 | 0 | 0 |
| | | Magnesium hydroxide | 0 | 0 | 0 | 0 | 1.5 | 0 | 0 | 0 | 0 | 0 | 0 | 0 | 0 | 0 |
| | Volatile expansion agent | Isopentane | 15 | 15 | 15 | 15 | 15 | 15 | 15 | 15 | 15 | 15 | 15 | 15 | 15 | 15 |
| | | Isooctane | 10 | 10 | 10 | 10 | 10 | 10 | 10 | 10 | 10 | 10 | 10 | 10 | 10 | 10 |
| | Polymerization initiator | 2,2′-Azobisisobutyronitrile | 0.8 | 0.8 | 0.8 | 0.8 | 0.8 | 0.8 | 0.8 | 0.8 | 0.8 | 0.8 | 0.8 | 0.8 | 0.8 | 0.8 |
| | | 2,2′-Azobis(4-methoxy-2,4-dimethyl-valeronitrile) | 0.6 | 0.6 | 0.6 | 0.6 | 0.6 | 0.6 | 0.6 | 0.6 | 0.6 | 0.6 | 0.6 | 0.6 | 0.6 | 0.6 |
| Volume average particle diameter [μm] | | 31 | 30 | 30 | 28 | 30 | 32 | 35 | 32 | 28 | 32 | 30 | 31 | 30 | 31 |
| Foaming starting temperature (Ts) [° C.] | | 125 | 155 | 158 | 165 | 162 | 155 | 120 | 115 | 160 | 162 | 150 | 152 | 165 | 125 |
| Maximum foaming temperature (Tmax) [° C.] | | 185 | 210 | 221 | 222 | 223 | 215 | 170 | 165 | 220 | 221 | 195 | 205 | 215 | 190 |
| Maximum displacement amount (Dmax) [μm] | | 1200 | 915 | 1100 | 850 | 950 | 800 | 1300 | 200 | 100 | 250 | 1250 | 1000 | 900 | 1250 |
| Expansion ratio upon heating at 200° C. for 1 min | | 27 | 37 | 32 | 43 | 32 | 27 | 15 | 4 | 2 | 5 | 32 | 27 | 27 | 32 |
| Degree of cross-linkage [wt %] | | 75 | 72 | 80 | 70 | 72 | 72 | 75 | 20 | 78 | 78 | 25 | 0 | 0 | 0 |
| Elastic modulus E′ (200° C., 10 Hz) [N/m²] | | $1.1 \times 10^7$ | $6.5 \times 10^6$ | $4.0 \times 10^7$ | $2.5 \times 10^7$ | $7.5 \times 10^7$ | $1.5 \times 10^7$ | $8.1 \times 10^4$ | $8.1 \times 10^5$ | $2.5 \times 10^7$ | $5.5 \times 10^7$ | $7.5 \times 10^5$ | $6.5 \times 10^5$ | $3.5 \times 10^7$ | $8.5 \times 10^4$ |
| Elastic modulus E′ (250° C., 10 Hz) [N/m²] | | $2.8 \times 10^8$ | $3.5 \times 10^6$ | $3.0 \times 10^7$ | $9.5 \times 10^6$ | $6.5 \times 10^7$ | $8.5 \times 10^6$ | $2.2 \times 10^7$ | $2.2 \times 10^4$ | $9.5 \times 10^6$ | $5.0 \times 10^7$ | $6.5 \times 10^4$ | $6.5 \times 10^3$ | $3.5 \times 10^4$ | $3.5 \times 10^3$ |
| Elastic modulus G′ (200° C., 10 Hz) [N/m²] | | $4.8 \times 10^5$ | $8.5 \times 10^5$ | $9.0 \times 10^6$ | $4.5 \times 10^6$ | $2.5 \times 10^6$ | $8.5 \times 10^6$ | $1.8 \times 10^5$ | $2.8 \times 10^5$ | $7.0 \times 10^5$ | $1.5 \times 10^6$ | $8.5 \times 10^4$ | $7.5 \times 10^4$ | $2.5 \times 10^6$ | $2.5 \times 10^4$ |
| Elastic modulus G′ (200° C., 0.01 Hz) [N/m²] | | $5.0 \times 10^5$ | $4.0 \times 10^6$ | $2.0 \times 10^7$ | $1.5 \times 10^7$ | $5.5 \times 10^7$ | $9.0 \times 10^6$ | $3.5 \times 10^3$ | $3.5 \times 10^3$ | $1.5 \times 10^7$ | $1.5 \times 10^7$ | $6.5 \times 10^4$ | $8.5 \times 10^3$ | $5.5 \times 10^3$ | $6 \times 10^3$ |
| tan δ (200° C., 10 Hz) | | 0.22 | 0.15 | 0.28 | 0.26 | 0.24 | 0.25 | 0.41 | 0.61 | 0.36 | 0.5 | 0.46 | 0.63 | 0.5 | 0.56 |
| tan δ (200° C., 0.01 Hz) | | 0.28 | 0.24 | 0.25 | 0.24 | 0.29 | 0.24 | 0.36 | 0.60 | 0.42 | 0.59 | 0.48 | 0.5 | 0.56 | 0.53 |

(2) Evaluation of Molded Body
(2-1) Appearance (Cross Section of Molded Body)
The state of the foams in the cross section of the molded body was observed with an SEM apparatus.
(2-2) Measurement of Density
The specific gravity of the obtained molded body was measured by a method based on Method A (underwater substitution method) of JIS K 7112.

TABLE 2

| | | Examples | | | | | | Comparative Examples | |
|---|---|---|---|---|---|---|---|---|---|
| | | 1 | 2 | 3 | 4 | 5 | 6 | 1 | 2 |
| Polypropylene resin | | 100 | 100 | 100 | 100 | 100 | 100 | 100 | 100 |
| Thermally expandable microcapsules (amount of masterbatch pellet) | No. (1) | 5 | — | — | — | — | — | — | — |
| | No. (2) | — | 5 | — | — | — | — | — | — |
| | No. (3) | — | — | 5 | — | — | — | — | — |
| | No. (4) | — | — | — | 5 | — | — | — | — |
| | No. (5) | — | — | — | — | 5 | — | — | — |
| | No. (6) | — | — | — | — | — | 5 | — | — |
| | No. (7) | — | — | — | — | — | — | 5 | — |
| | No. (8) | — | — | — | — | — | — | — | 5 |
| | No. (9) | — | — | — | — | — | — | — | — |
| | No. (10) | — | — | — | — | — | — | — | — |
| | No. (11) | — | — | — | — | — | — | — | — |
| | No. (12) | — | — | — | — | — | — | — | — |
| | No. (13) | — | — | — | — | — | — | — | — |
| | No. (14) | — | — | — | — | — | — | — | — |
| Density (g/cm$^3$) | | 0.655 | 0.58 | 0.605 | 0.595 | 0.58 | 0.59 | 0.865 | 0.870 |
| State of cell in cross section | | Closed cell | Closed cell | Closed cell | Closed cell | Closed cell | Closed cell | Closed cell | Largely crushed |

| | | Comparative Examples | | | | | |
|---|---|---|---|---|---|---|---|
| | | 3 | 4 | 5 | 6 | 7 | 8 |
| Polypropylene resin | | 100 | 100 | 100 | 100 | 100 | 100 |
| Thermally expandable microcapsules (amount of masterbatch pellet) | No. (1) | — | — | — | — | — | — |
| | No. (2) | — | — | — | — | — | — |
| | No. (3) | — | — | — | — | — | — |
| | No. (4) | — | — | — | — | — | — |
| | No. (5) | — | — | — | — | — | — |
| | No. (6) | — | — | — | — | — | — |
| | No. (7) | — | — | — | — | — | — |
| | No. (8) | — | — | — | — | — | — |
| | No. (9) | 5 | — | — | — | — | — |
| | No. (10) | — | 5 | — | — | — | — |
| | No. (11) | — | — | 5 | — | — | — |
| | No. (12) | — | — | — | 5 | — | — |
| | No. (13) | — | — | — | — | 5 | — |
| | No. (14) | — | — | — | — | — | 5 |
| Density (g/cm$^3$) | | 0.805 | 0.765 | 0.785 | 0.75 | 0.855 | 0.8 |
| State of cell in cross section | | Closed cell | Slightly crushed | Slightly crushed | Slightly crushed | Largely crushed | Largely crushed |

As shown in Tables 1 and 2, the thermally expandable microcapsules each obtained in Examples 2 to 6 had a maximum foaming temperature of 200° C. or higher and thus showed high heat resistance. The thermally expandable microcapsules each obtained in Examples 1 to 6 showed a high storage elastic modulus at a temperature of 200° C. and a frequency of 10 Hz, a high storage elastic modulus at a temperature of 250° C. and a frequency of 10 Hz, and a tan δ as low as 0.4 or less. Accordingly, a molded product having good foaming performance, a low density, and excellent lightness was produced.

INDUSTRIAL APPLICABILITY

According to the present invention, it is possible to provide a thermally expandable microcapsule, which shows excellent heat resistance and a high expansion ratio and thereby can be suitably used for molding processes involving high shearing force, such as kneading molding, calender molding, extrusion molding, and injection molding. The present invention also provides a foamed product using the thermally expandable microcapsule.

The invention claimed is:

1. A thermally expandable microcapsule, which comprises:
a shell made of a polymer; and
a volatile expansion agent as a core agent encapsulated in the shell,
a storage elastic modulus (E') of the shell at a temperature of 200° C. and a frequency of 10 Hz being $1 \times 10^5$ N/m$^2$ or more,
the storage elastic modulus (E') of the shell at a temperature of 250° C. and a frequency of 10 Hz being $1 \times 10^5$ N/m$^2$ or more, and
a maximum displacement amount measured by thermomechanical analysis being 300μm or more,
wherein the shell comprises a polymer obtainable by polymerizing a monomer mixture that contains 95% by weight or more of a mixture of acrylonitrile and methacrylonitrile,
wherein the mixture of acrylonitrile and methacrylonitrile contains 70% by weight or more of acrylonitrile relative to the total weight of the mixture of acrylonitrile and methacrylonitrile, and wherein a degree of crosslinkage is 60% by weight or more.

2. A thermally expandable microcapsule, which comprises a shell made of a polymer; and a volatile expansion agent as a core agent encapsulated in the shell, a storage elastic modulus (E') of the shell at a temperature of 200° C. and a frequency of 10 Hz being $1 \times 10^5$ N/m$^2$ or more, the storage elastic modulus (E') of the shell at a temperature of 250° C. and a frequency of 10 Hz being $1 \times 10^5$ N/m$^2$ or more, and an expansion ratio upon heating at a temperature of 200° C. for 1 minute being 20 times or more in volume, wherein the shell comprises a polymer obtainable by polymerizing a monomer mixture that contains 95% by weight or more of a mixture of acrylonitrile and methacrylonitrile, wherein the mixture of acrylonitrile and methacrylonitrile contains 70% by weight or more of acrylonitrile relative to the total weight of the mixture of acrylonitrile and methacrylonitrile, and wherein a degree of crosslinkage is 60% by weight or more.

3. The thermally expandable microcapsule according to claim 1, wherein the ratio tan δ of a shear storage elastic modulus (G') to a loss elastic modulus (G") of the shell at a temperature of 200° C. and a frequency of 10 Hz is 0.4 or less, and the ratio tan δ of the shear storage elastic modulus (G') to the loss elastic modulus (G") of the shell at a temperature of 200° C. and a frequency of 0.01 Hz is 0.4 or less.

4. The thermally expandable microcapsule according to claim 1, wherein the shear storage elastic modulus (G') of the shell at a temperature of 200° C. and a frequency of 10 Hz is $1 \times 10^5$ N/m$^2$ or more, and the shear storage elastic modulus (G') of the shell at a temperature of 200° C. and a frequency of 0.01 Hz is $1 \times 10^4$ N/m$^2$ or more.

5. The thermally expandable microcapsule according to claim 1, wherein the maximum foaming temperature of the thermally expandable microcapsule is 200° C. or higher.

6. A foamed product, which comprises the thermally expandable microcapsule according to claim 1.

7. The thermally expandable microcapsule according to claim 2, wherein the ratio tan δ of a shear storage elastic modulus (G') to a loss elastic modulus (G") of the shell at a temperature of 200° C. and a frequency of 10 Hz is 0.4 or less, and the ratio tan δ of the shear storage elastic modulus (G') to the loss elastic modulus (G") of the shell at a temperature of 200° C. and a frequency of 0.01 Hz is 0.4 or less.

8. The thermally expandable microcapsule according to claim 2, wherein the shear storage elastic modulus (G') of the shell at a temperature of 200° C. and a frequency of 10 Hz is $1 \times 10^5$ N/m$^2$ or more, and the shear storage elastic modulus (G') of the shell at a temperature of 200° C. and a frequency of 0.01 Hz is $1 \times 10^4$ N/m$^2$ or more.

9. The thermally expandable microcapsule according to claim 3, wherein the shear storage elastic modulus (G') of the shell at a temperature of 200° C. and a frequency of 10 Hz is $1 \times 10^5$ N/m$^2$ or more, and the shear storage elastic modulus (G') of the shell at a temperature of 200° C. and a frequency of 0.01 Hz is $1 \times 10^4$ N/m$^2$ or more.

10. The thermally expandable microcapsule according to claim 2, wherein the maximum foaming temperature of the thermally expandable microcapsule is 200° C. or higher.

11. The thermally expandable microcapsule according to claim 3, wherein the maximum foaming temperature of the thermally expandable microcapsule is 200° C. or higher.

12. The thermally expandable microcapsule according to claim 4, wherein the maximum foaming temperature of the thermally expandable microcapsule is 200° C. or higher.

13. A foamed product, which comprises the thermally expandable microcapsule according to claim 2.

14. A foamed product, which comprises the thermally expandable microcapsule according to claim 3.

15. A foamed product, which comprises the thermally expandable microcapsule according to claim 4.

* * * * *